US010996973B2

(12) United States Patent
Stanley et al.

(10) Patent No.: US 10,996,973 B2
(45) Date of Patent: May 4, 2021

(54) EXECUTING COMMANDS IN A VIRTUAL ENVIRONMENT (71) Applicant: INTERNATIONAL BUSINESS MACHINES CORPORATION, Armonk, NY (US)

(72) Inventors: Katherine E. Stanley, Hursley (GB); Adam J. Pilkington, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 51 days.

(21) Appl. No.: 16/188,515

(22) Filed: Nov. 13, 2018

(65) Prior Publication Data
US 2020/0150992 A1 May 14, 2020

(51) Int. Cl.
G06F 9/455 (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS 9,158,571 B2 * 10/2015 Rosato ............... G06F 9/45558
9,183,008 B2    11/2015 Zhang
9,367,305 B1     6/2016 Kumar et al.
9,632,811 B2 *  4/2017 Kraus ................. G06F 3/0482
2007/0282964 A1 12/2007 Behrend et al.
2017/0192813 A1  7/2017 King
2019/0243628 A1 * 8/2019 Goldmann ........... G06F 16/188

OTHER PUBLICATIONS http://phase2.github.io/devtools/common-tasks/ssh-into-a-contained, "SSH into a Container"—DevTools CLI Documentation, printed Mar. 14, 2018, pp. 1-2.
http://download.swsoft.com/virtuozzo/virtuozzo4.0/docs/en/lin/VzLinuxUG/260.htm 11:17:54 AM "Running Commands in Container", printed Mar. 14, 2018, p. 1.
Mell et al., "The NIST Definition of Cloud Computing", National Institute of Standards and Technology, Special Publication 800-145, Sep. 2011, pp. 1-7.

* cited by examiner

Primary Examiner — Van H Nguyen
(74) Attorney, Agent, or Firm — Dmitry Paskalov (57) ABSTRACT A system, a method, and a computer program product for use with a virtualization environment operable to execute one or more virtualization functions. A computing device determines an identifier associated with a first virtualization function. The computing device determines one or more commands available for execution using the first virtualization function. The computing device stores each determined command with the first virtualization function identifier. The computing device responsive to an input of a first command, matches the first command with each determined command in order to determine one or more matching commands. Responsive to selection of a first matching command, the computing device executes the associated first virtualization function and the first matching command.

15 Claims, 7 Drawing Sheets

EXECUTING COMMANDS IN A VIRTUAL ENVIRONMENT

BACKGROUND

The present invention relates generally to virtualization and, more particularly, to executing one or more commands for use with a virtualization environment.

SUMMARY

According to a first aspect, there is provided an apparatus for executing one or more commands, for use with a virtualization environment operable to execute one or more virtualization functions, the apparatus comprising: an interface operable to determine an identifier associated with a first virtualization function; a parser operable to determine one or more commands available for execution using the first virtualization function; a store for storing each determined command with the first virtualization function identifier; a searcher, responsive to input of a first command, for matching the first command with each determined command in order to determine one or more matching commands; and an executor, responsive to selection of a first matching command, for executing the associated first virtualization function and the first matching command.

According to a second aspect, there is provided a method for executing one or more commands, for use with a virtualization environment operable to execute one or more virtualization functions, the method comprising: determining an identifier associated with a first virtualization function; determining one or more commands available for execution using the first virtualization function; storing each determined command with the first virtualization function identifier; matching, in response to input of a first command, the first command with each determined command in order to determine one or more matching commands; and executing, in response to selection of a first matching command, the associated first virtualization function and the first matching command.

According to a third aspect, there is provided a computer program product comprising a computer readable storage medium having program instructions embodied therewith, wherein the program instructions are executable by a processor to cause the processor to: determine an identifier associated with a first virtualization function; determine one or more commands available for execution using the first virtualization function; store each determined command with the first virtualization function identifier; match, in response to input of a first command, the first command with each determined command in order to determine one or more matching commands; and execute, in response to selection of a first matching command, the associated first virtualization function and the first matching command.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete, and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements of various embodiments of the present invention.

Virtualization is a widely used technique, e.g., in Cloud development and associated deployment. It allows for application deployment on heterogeneous host systems with minimal configuration required of guest systems.

Figure 1:
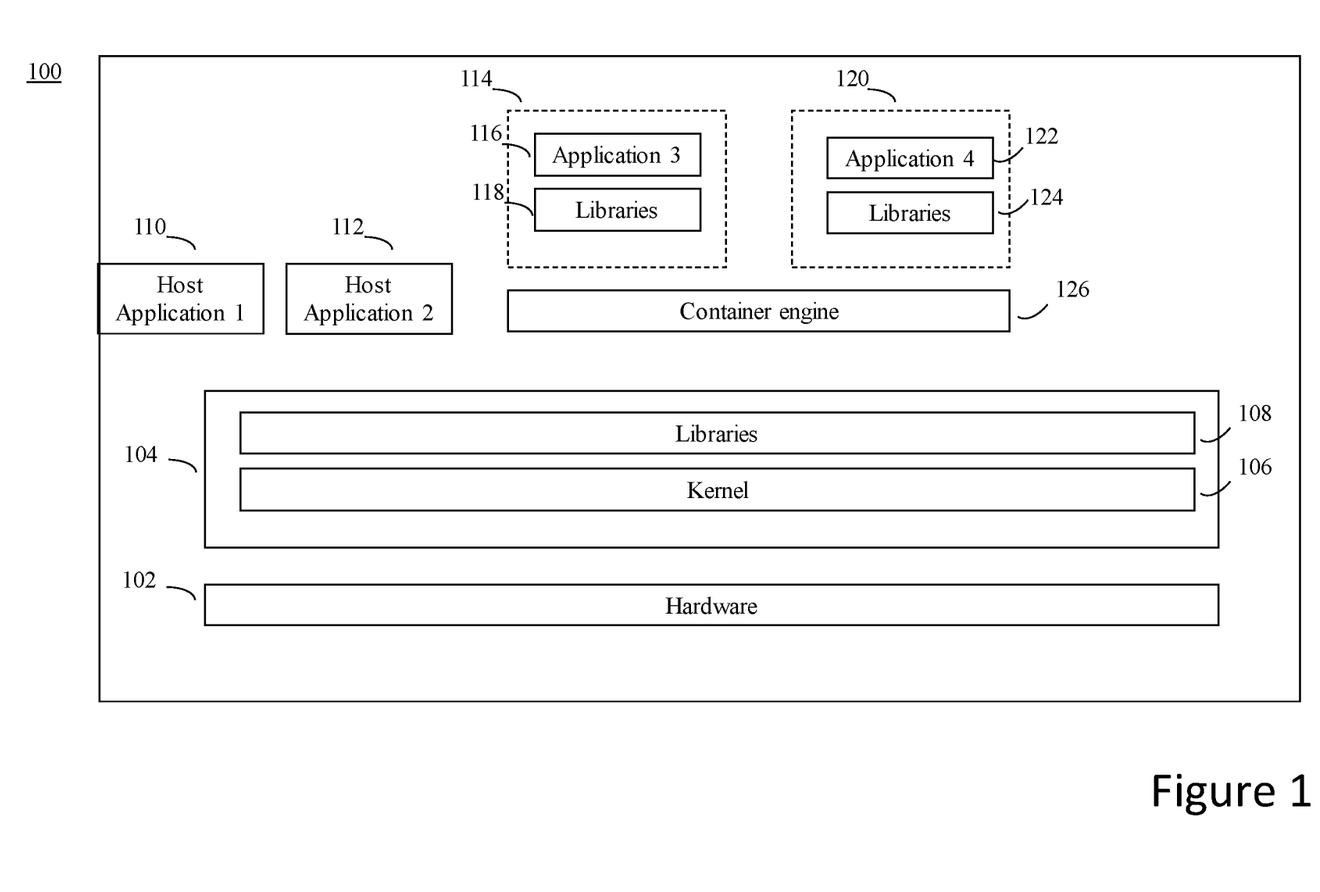
FIG. 1 illustrates a diagram illustrating a containerization environment, in accordance with an embodiment of the present invention.

An example of an operating system virtualization environment, known as a containerization environment, is shown in FIG. 1. Although a containerization environment is described with reference to FIG. 1, it should be understood that the preferred embodiment is operable to be implemented with other examples of virtualization environments, e.g., hardware virtualization using hypervisor techniques.

The host system (100) comprises hardware (102) and a host operating system (104). The host operating system (104) comprises a kernel (106), which is one of the first programs to load to memory upon system initialization and controls other parts of the host system (100), e.g., memory and hardware peripherals such as keyboards, monitors, printers, and speakers. The operating system (104) also comprises a number of libraries (108) having, e.g., configuration data, functional code, and sub-routines. The host system (100) further comprises one or most host applications (110, 112) which, in operation, are operable to make calls to the libraries (108), e.g., for data.

The host system (100) also comprises components associated with operating system virtualization, e.g., a container engine (126) operable for running one or more virtualization functions, known as containers (114, 120), wherein the container engine (126) is operable to control an interface between a container and the host operating system.

A container (114, 120) comprises one or more applications (116, 122) and dependencies associated with the one or more applications (116, 122), e.g., libraries (118, 124). A container (114, 120) allows an application to run in a user space portion of a guest operating system. The user space is isolated from functions associated with a guest kernel and as such, an application running in a container can run independently of a particular type of underlying host operating system.

Containerization environments, such as Docker, allow a user to generate a container image, which is typically a file comprising executable code. A user can associate the container image with a container identifier, e.g., of the format "name:version". In response to running the image, an associated container is operable to be generated (e.g., using a "docker run" command). In response to running the container, a user is able to execute commands within the running container.

For example, a user may input the following, where "containera:latest" is a container identifier and "shred' is a command:

docker run containera:latest/mycommands/shred

However, in order to run commands in a container, the user needs to first have knowledge of the container identifier. Since a user's machine may be running very large numbers of containers and since the containers may not be intuitively identified according to, e.g., a naming scheme, it can be difficult for a user to identify a particular container that he/she needs to connect to.

It can also difficult to ascertain which particular commands function in a particular container as each container may comprise an associated subset of commands that are unique to it. Alternatively, there can be a subset of commands that are common to more than one container.

The preferred embodiment allows for a user to be able to execute commands in a virtualization environment without having to have knowledge of identifiers associated with the environment or of the particular commands that function in the environment.

Figure 2:
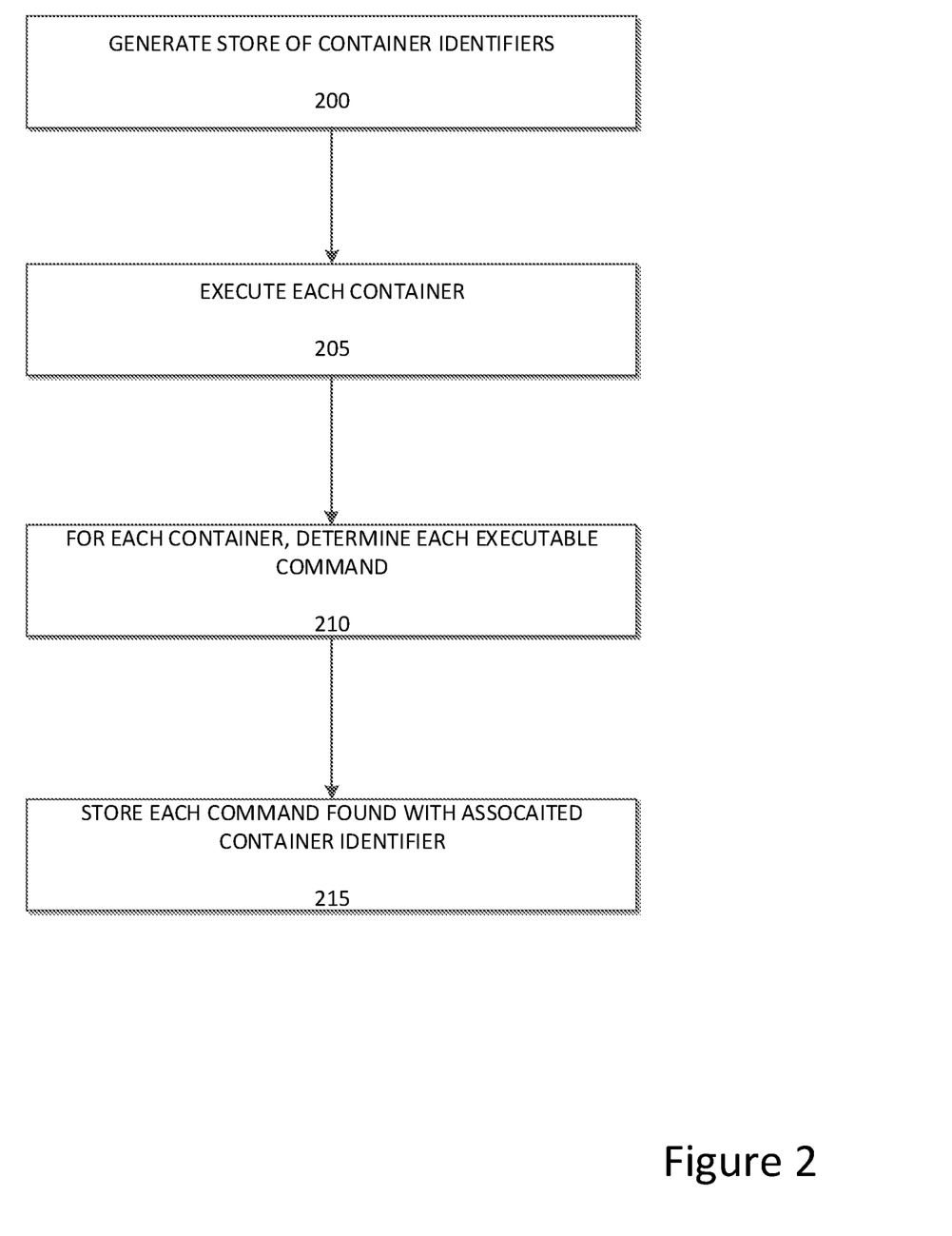
FIG. 2 illustrates a flow chart depicting the operations of the present invention, according to an embodiment of the present invention.
Figure 4:
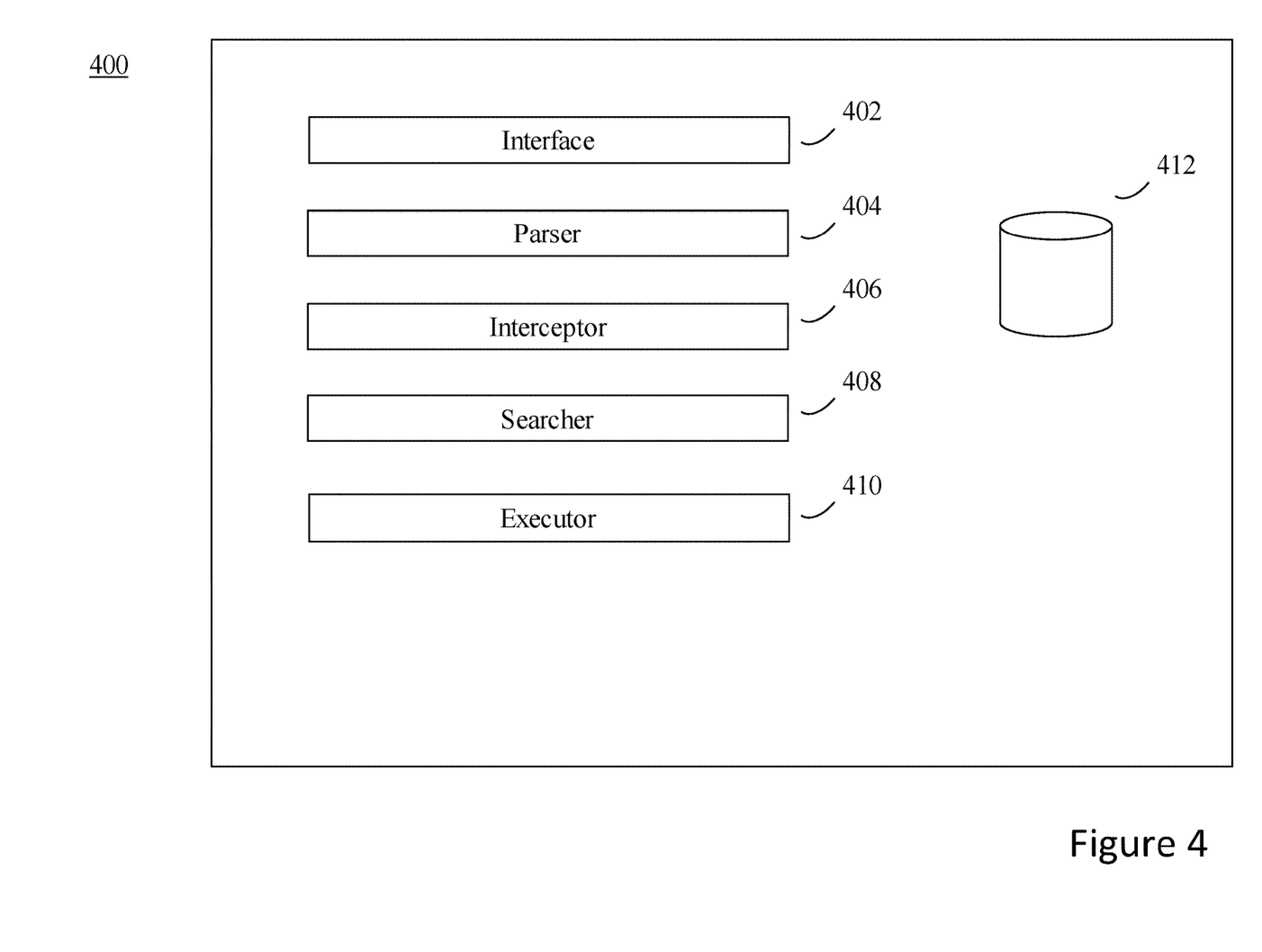
FIG. 4 illustrates a diagram of an apparatus, in accordance with an embodiment of the present invention.

With reference to FIG. 2, which depicts a first method according to the preferred embodiment and to FIG. 4, which depicts a system (400) according to the preferred embodiment operable to communicate with the host system (100), at step 200, an interface (402) is operable to determine an identifier associated with each container that is executable on the host system (100).

For example, the interface (402) is operable to query (e.g., using a "docker images" command) a container service in order to obtain one or more container identifiers. In another example, the interface (402) is operable to query one or more running containers (e.g., using a "docker ps" command) in order to obtain one or more container identifiers.

In the example herein, the interface (402) determines that a first container (114) and a second container (120) are executable on the host system (100) and the interface (402) is operable to store identifiers (e.g., Container A and Container B, respectively) associated with each container in a data structure (e.g., a list) in a store (412) (e.g., a configuration file). It should be understood that the interface (402) can be configurable to recognize any number of container identifiers, e.g. a URL, a network address, a name, a token.

Preferably, the interface (402) is also operable to determine (e.g., using a host operating system command) an identifier (e.g., Host System 1) associated with the host system (100) and is operable to store the identifier associated with the host system (100) in the store (412).

In response to generating the first list, the interface (402) passes a first control signal to initialize the container engine (126), which is operable to execute (step 205) each of the containers (114, 120).

At step 210, for each of the containers (114 and 120), the parser (404) is operable to determine one or more commands available for execution. In an example herein, the parser (404) parses one or more values of an environment variable, e.g., "SPATH" associated with each container. SPATH is a known environment variable which defines one or more directories for storing one or more executable commands.

In an example herein, for each container (114 and 120), the parser (404) determines that the first container (114) comprises a first command, "repository 1.exe" and the second container (120) comprises a second command, "repository 2.exe" and a third command, "repository_a.exe".

In the example herein, the parser (404) is also operable to determine one or more commands available for execution associated with the host system (100), e.g., by parsing an associated SPATH environment variable. In the example herein, the host system (100) comprises a fourth command, "repository 3.exe", and a fifth command, "repository_a.exe".

At step 215, the parser (404) is operable to store each determined command in the first list with the associated container identifier. Preferably, the parser (404) is further operable to store each determined command in the first list with the associated host system identifier. In the example herein, a representation of the first list is shown below:

Container A; repository 1.exe
Container B; repository 2.exe, repository_a.exe
Host system 1; repository 3.exe, repository_a.exe It should be understood that in practice, the first list may comprise very large numbers of container identifiers, host system identifiers, and commands. It should also be understood that the parser (404) is configurable such that data associated with particular commands can be masked such that the data is not available to the parser (404) and thus, the parser (404) is not operable to add the associated commands to the first list.

Figure 3:
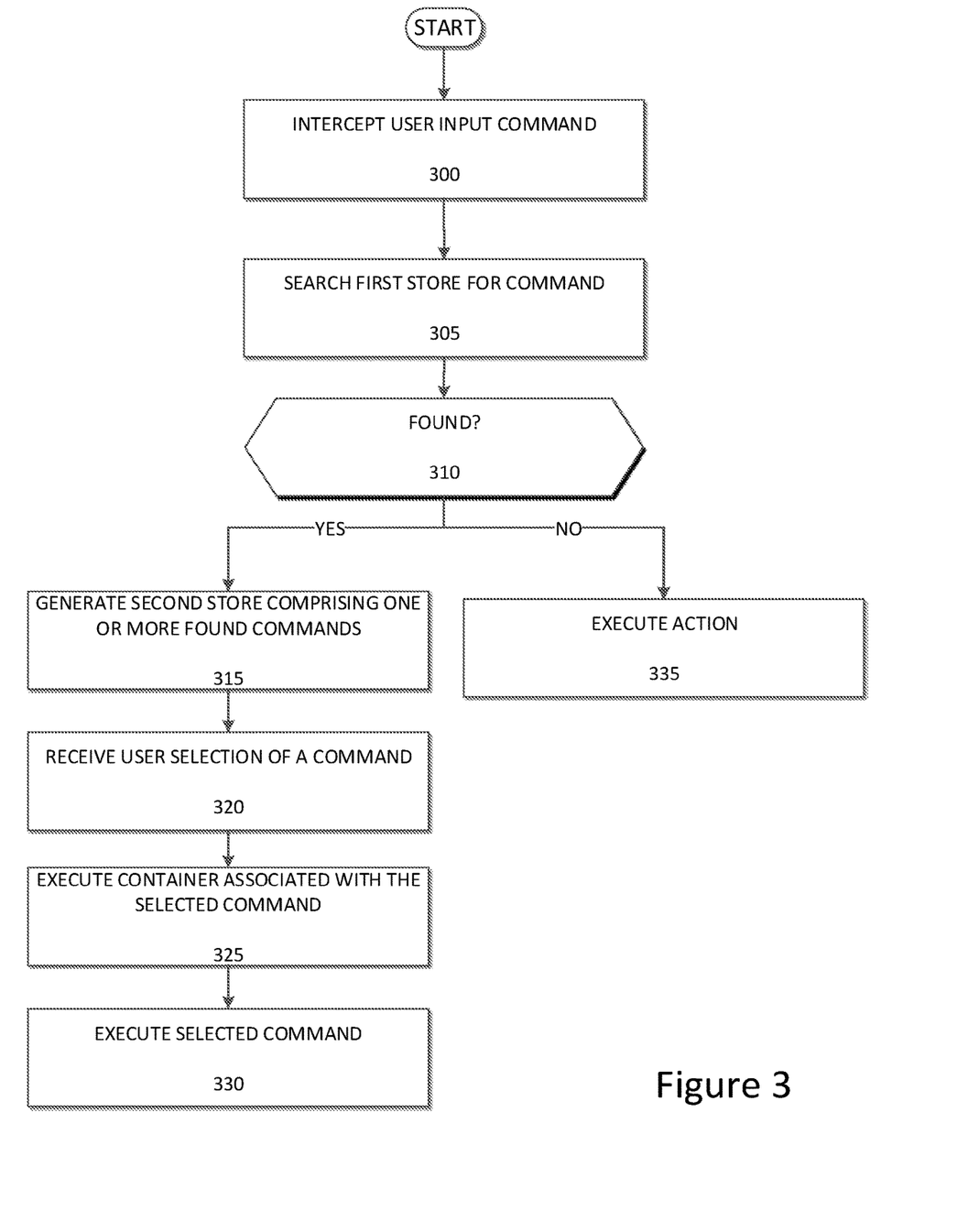
FIG. 3 illustrates a flow chart depicting the operations of the present invention, according to an embodiment of the present invention.

A second method according to the preferred embodiment, which is executed in response to user input comprising one or more commands, will now be described with reference to FIGS. 3 and 4.

In the preferred embodiment, the user is operable to input one or more commands using a first computer program, e.g., a shell, a terminal window, a command line provided by a toolkit associated with the host system (100) configurable to read and execute commands. Note that the first computer program is typically logically separate from each of the containers (114 and 120) executable on the host system (100).

At step 300, an interceptor (406) is operable to intercept (for example, by listening for an input device event associated with a terminal window) a first command (typically, alphanumeric characters), which a user inputs into, e.g., a terminal window associated with the host system (100).

The interceptor (406) is operable to parse (e.g., using known text parsing mechanisms) the user input. In the example herein, the user input is a partial input of a command (for example, for use with known autocomplete functions) as depicted below:

"repository"

At step 305, the searcher (408) is operable to use the parsed user input to search the first list (for example, using known text matching techniques) in order to find one or more matching entries.

At step 310, the searcher (408) determines if a matching entry is found. In response to the searcher (408) not finding a matching entry, the searcher (408) executes (step 335) an action (e.g., generates an audio/visual cue; in response to further user input, generates an error for display in the terminal window) and the method ends.

In response to the searcher (408) finding one or more matching entries, the searcher (408) generates (step 315) a second list comprising each matching entry. In the example herein, the second list is depicted below:

repository 1.exe
repository 2.exe
repository_a.exe
repository 3.exe

It should be understood that the searcher (408) is operable to sort the second list e.g., sequentially, alphabetically etc.

The searcher (408) inserts the second list for display in the terminal window. The user is operable (e.g., using known keyboard functions) to select an entry in the second list for execution, in this example, "repository_a.exe".

An executor (410) intercepts (step 320) (for example, by listening for an input device event associated with the terminal window) the user's selection of the command and accesses the first list in order to search the first list for at least one container identifier and host system identifier associated with the command.

In the example herein, the executor (410) determines a container identifier associated with the second container (120), namely, "Container B" and a host system identifier associated with the host system (100), namely "Host System 1".

The executor (410) selects for execution, one or more of the second container (120) and the host system (100) e.g., in the order in which they appear in the first list; in response to user selection.

In the example herein, the executor (410) passes a second control signal to initialize the container engine (126), which is operable to execute (step 325) the associated second container (120). The container engine (126) passes the command to the second container (120), which executes (step 330) the command. For example, the container engine (126) is operable to override a default start command associated with the second container (120) and passes the command, "repository_a.exe", to the second container (120) for execution, e.g., using "docker exec containerB repository_a.exe".

Advantageously, an embodiment allows for execution of a command without a user needing to have knowledge of a container identifier and/or a command identifier. Furthermore, a user is able to initialize input of a command in a logically separate environment (e.g., a terminal window) from the container. Furthermore, in said embodiment, a command is operable to be executed without a container first needing to be executed.

According to a first alternative embodiment, rather than executing the first method of FIG. 2, which results in a pre-built first list that can be subsequently used in response to user input of a command, preferably, each container is operable to be executed with an associated searcher. In response to user input of a command, the searcher is operable to receive the command and is operable to query the executing container for the command. The searcher is operable to provide each matching command to the user for selection. In response to user selection, the command is operable to be sent to the container for execution, e.g., by the searcher, by using a docker exec command.

Further, according to a second alternative embodiment, rather than storing the container identifiers, host system identifiers, and commands in a data structure such as a list, the container identifiers, host system identifiers, and commands can be stored, e.g., using an environment variable such as SPATH, in memory.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a method, computer system, and computer program product have been disclosed. However, numerous modifications and substitutions can be made without deviating from the scope of the present invention. Therefore, the present invention has been disclosed by way of example and not limitation.

Figure 5:
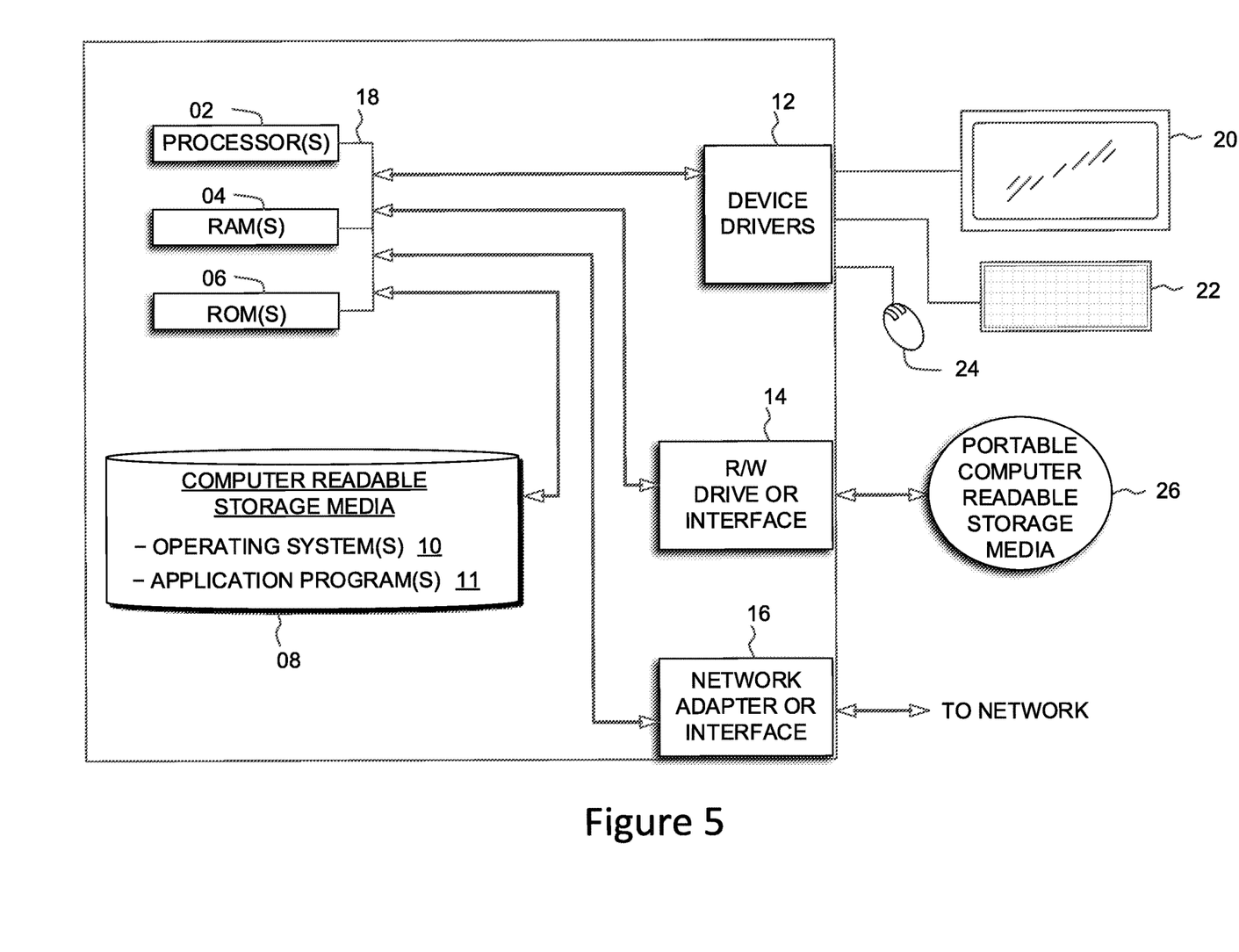
FIG. 5 illustrates a block diagram depicting hardware components, in accordance with an embodiment of the present invention.

FIG. 5 illustrates a block diagram depicting hardware components, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10 and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
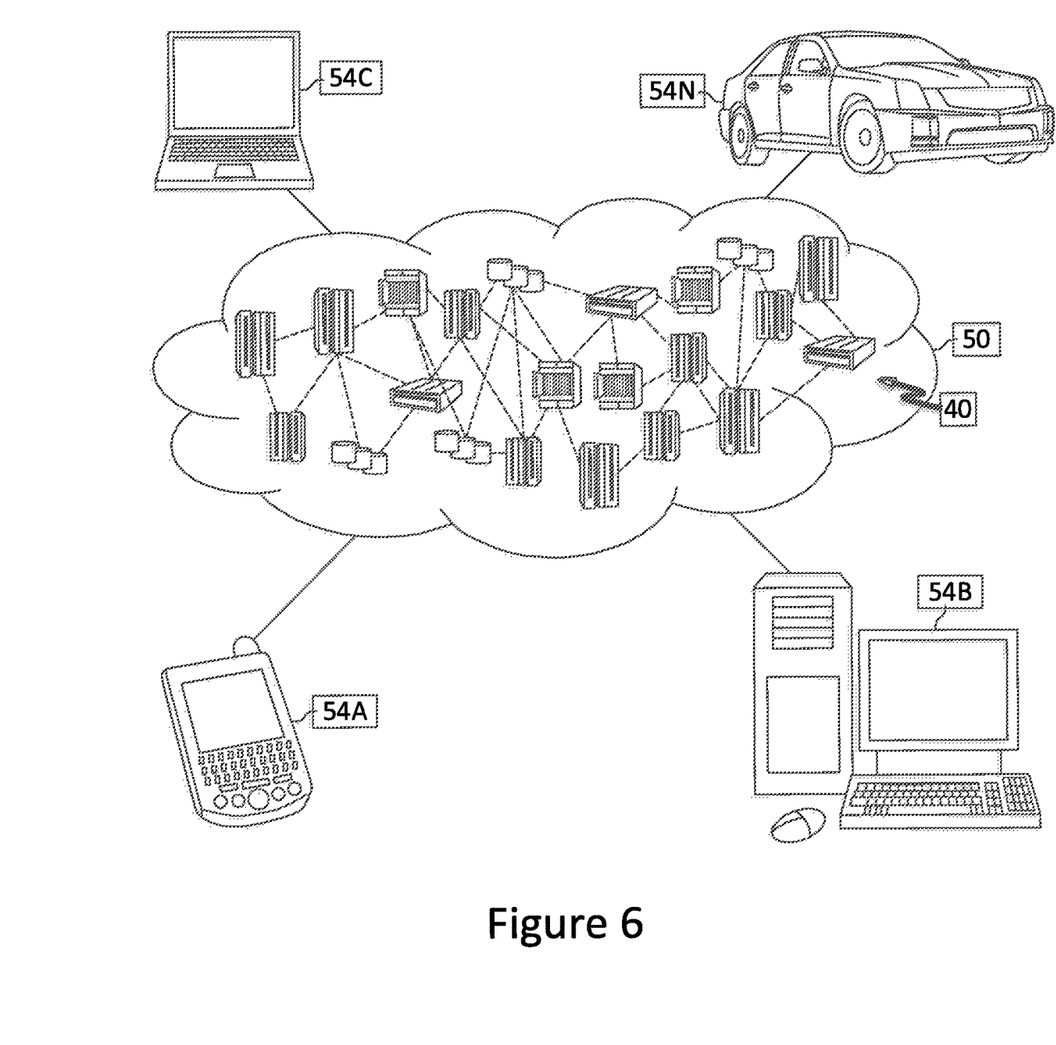
FIG. 6 illustrates a cloud computing environment according to an example implementation.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 7:
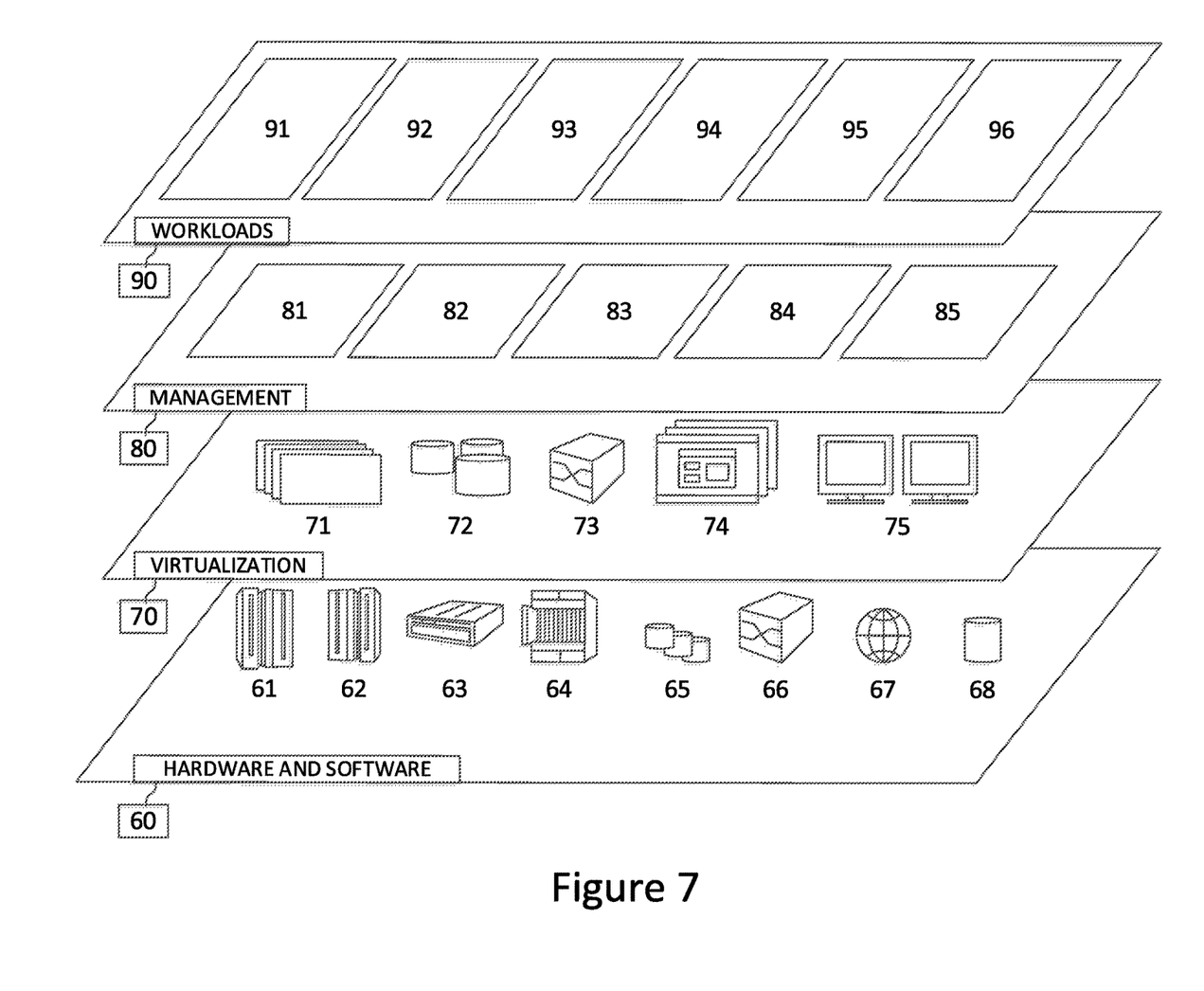
FIG. 7 illustrates abstraction model layers according to an example implementation.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wind processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for executing one or more commands, for use with a virtualization environment operable to execute one or more virtualization functions, the method comprising:
   determining a first identifier associated with a first virtualization function and a second identifier associated with a second virtualization function;
   determining one or more commands available for execution using the first virtualization function;
   determining one or more commands available for execution using the second virtualization function;
   storing under the first identifier the determined one or more commands associated to the first virtualization function and under the second identifier the determined one or more commands associated to the second virtualization function;
   determining, in response to an input of a first command, whether the first command corresponds to either the first identifier or the second identifier by matching the first command with each of the stored one or more commands;
   based on determining the first command corresponds to the first identifier, executing, the first virtualization function and the first command; and
   inputting the first command using a computer program associated with a logically separate environment from the first virtualization function.

2. The method as claimed in claim 1, further comprising:
   based on determining the first command corresponds to the second identifier, executing, the second virtualization function and the first command.

3. The method as claimed in claim 1, wherein the virtualization environment comprises a containerization environment.

4. The method as claimed in claim 1, wherein the first virtualization function comprises a container.

5. The method as claimed in claim 1, further comprising:
   executing the first command using a host system.

6. A computer program product comprising a computer readable storage medium having program instructions embodied therewith, wherein the program instructions are executable by a processor to cause the processor to:
   determine a first identifier associated with a first virtualization function and a second identifier associated with a second virtualization function;
   determine one or more commands available for execution using the first virtualization function;
   determining one or more commands available for execution using the second virtualization function;
   store under the first identifier the determined one or more commands associated to the first virtualization function and under the second identifier the determined one or more commands associated to the second virtualization function;
   determine, in response to an input of a first command, whether the first command corresponds to either the first identifier or the second identifier by matching the first command with each of the stored one or more commands;
   based on determining the first command corresponds to the first identifier, execute, the first virtualization function and the first command; and inputting the first command using a computer program associated with a logically separate environment from the first virtualization function.

7. The computer program product as claimed in claim 6, further comprising:
based on determining the first command corresponds to the second identifier, execute, the second virtualization function and the first command.

8. The computer program product as claimed in claim 6, wherein the virtualization environment comprises a containerization environment.

9. The computer program product as claimed in claim 6, wherein the first virtualization function comprises a container.

10. The computer program product as claimed in claim 6, further comprising:
executing the first command using a host system.

11. A computer system for executing one or more commands, for use with a virtualization environment operable to execute one or more virtualization functions, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
determining a first identifier associated with a first virtualization function and a second identifier associated with a second virtualization function;
determining one or more commands available for execution using the first virtualization function;
determining one or more commands available for execution using the second virtualization function;
storing under the first identifier the determined one or more commands associated to the first virtualization function and under the second identifier the determined one or more commands associated to the second virtualization function;
determining, in response to an input of a first command, whether the first command corresponds to either the first identifier or the second identifier by matching the first command with each of the stored one or more commands;
based on determining the first command corresponds to the first identifier, executing, the first virtualization function and the first command; and
inputting the first command using a computer program associated with a logically separate environment from the first virtualization function.

12. The computer system as claimed in claim 11, further comprising:
based on determining the first command corresponds to the second identifier, executing, the second virtualization function and the first command.

13. The computer system as claimed in claim 11, wherein the virtualization environment comprises a containerization environment.

14. The computer system as claimed in claim 11, wherein the first virtualization function comprises a container.

15. The computer system as claimed in claim 11, further comprising:
executing the first matching command using a host system.

* * * * *